June 26, 1934.  C. S. HAZARD  1,964,352
REGISTER
Filed May 10, 1933   2 Sheets-Sheet 1

INVENTOR
Charles S. Hazard
BY
Redding, Greeley, O'Shea & Campbell
ATTORNEYS

June 26, 1934.  C. S. HAZARD  1,964,352
REGISTER
Filed May 10, 1933  2 Sheets-Sheet 2
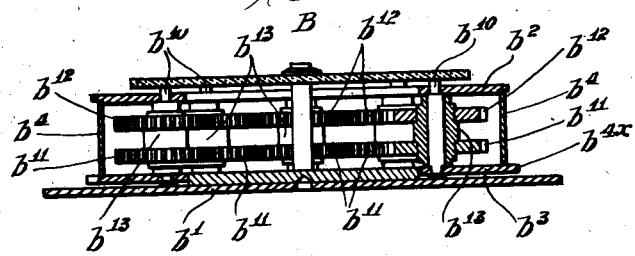
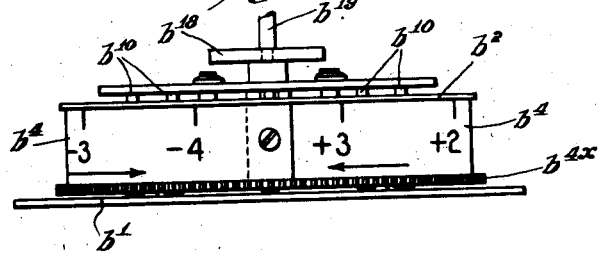
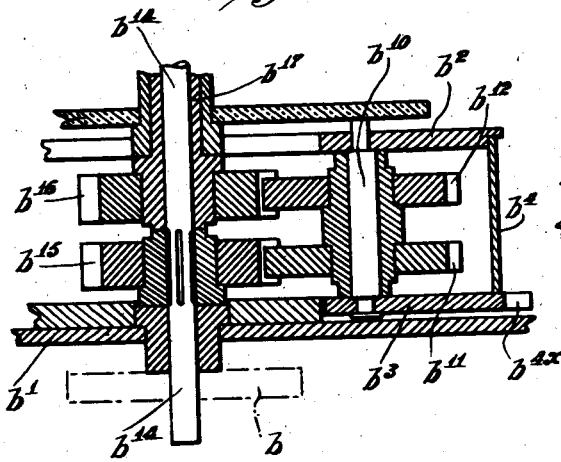
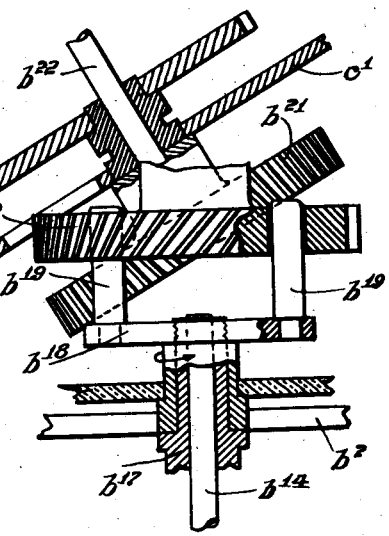
INVENTOR
Charles S. Hazard
BY
Redding, Greeley, O'Shea Campbell
ATTORNEYS Patented June 26, 1934

1,964,352

UNITED STATES PATENT OFFICE 1,964,352

REGISTER

Charles S. Hazard, Flushing, N. Y., assignor to Neptune Meter Company, New York, N. Y., a corporation of New Jersey Application May 10, 1933, Serial No. 670,282

1 Claim. (Cl. 74—58)

This invention has been developed with particular reference to its use in connection with meters for gasoline and other fluids and will be described with reference to such use but as this description proceeds it will be seen that it is capable of application to other uses. In the movement or sale of various commodities, such as gasoline, for example, in connection with which registration is effected of the quantity of the commodity or the price it is often necessary to provide means for effecting compensation, as for a change in unit price or for a change of temperature, or for some other reason, between the measuring instrumentality, such as a meter, and the register mechanism. To meet the demand for such provision it has been the practice for many years of manufacturers of water meters, gasoline meters, etc., to deliver with every meter and its register mechanism several pair of single change gears, of different ratios, to replace, as conditions may require, the gears removably mounted on the driving shaft and the driven shaft through which the register mechanism is actuated from the meter, such single change gears being properly marked according to the result to be produced. The substitution of such change gears necessitates the dismemberment of the apparatus to a limited extent and requires the services of a competent mechanic. It has been the object of the present invention to provide a construction which can be built into the apparatus and by which compensation of the register mechanism can be effected readily to accommodate changed conditions of operation. In accordance with the invention several pairs of differential gears are mounted upon a movable carrier so that a pair necessary to compensate for a change in operating conditions, such as a change in unit price, may be brought into operative relation with the gear actuated by the meter and the driving gear of the register mechanism.

The invention will be more fully explained hereinafter with reference to the accompanying drawings in which it is illustrated, and in which:

Figure 3 is a view in section on the plane indicated by the broken line 3—3 of Figure 2.

Figure 4 is a view in side elevation of the compensating mechanism.

Figure 5 is a detail view in section, on a larger scale, through one of the pairs of differential gears and the gears with which they coact.

Figure 6 is a detail view, on a larger scale, of the driving connection between the compensating mechanism and the register mechanism.

Figure 1:
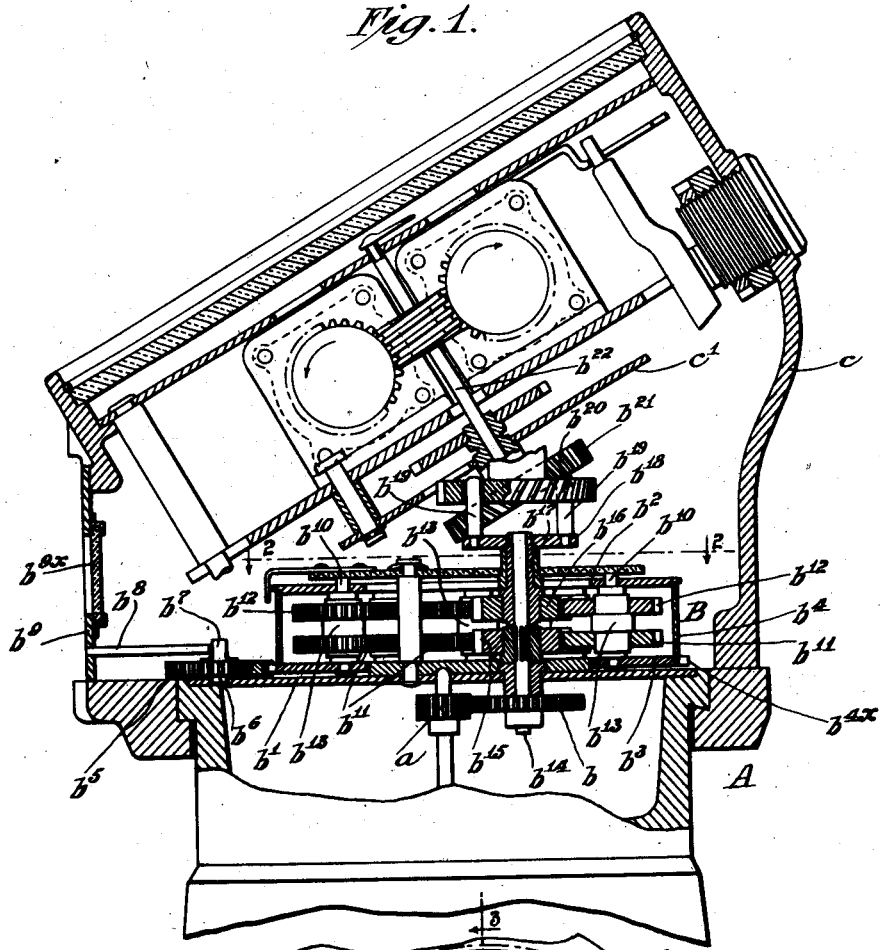
Figure 1 is a view in sectional elevation of a meter in which the improved compensating device is incorporated between the meter mechanism, a portion of the casing of which is shown, and the register mechanism which is shown mainly in outline, the compensating mechanism being shown in diametrical section.
Figure 2:
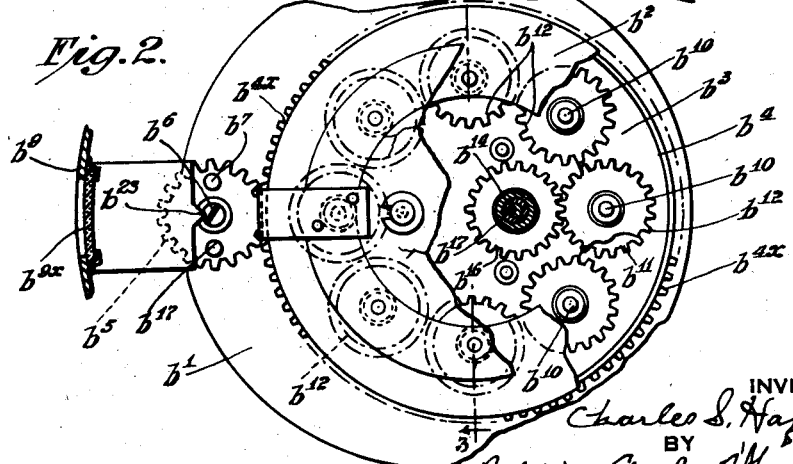
Figure 2 is a top view of the compensating mechanism.

The measuring instrumentality, as indicated at A, may be of any usual or suitable construction, having, in the form illustrated, a pinion $a$ in engagement with a gear $b$ of the compensating mechanism which is shown generally at B. The register mechanism may also be of any usual or suitable construction and is therefore shown in outline only. It is here shown as arranged at an angle with respect to the compensating mechanism and the top of the meter and may be driven from the compensating mechanism through gearing to be described.

The compensating mechanism is mounted to rotate on a supporting plate $b^1$ and comprises a cylindrical rotatable carrier formed of two annular plates $b^2$ and $b^3$ and an enclosing wall $b^4$. The plate $b^3$ is shown as formed with gear teeth, as at $b^{4x}$, for engagement with a pinion $b^5$ mounted on a stud $b^6$ secured to the plate $b^1$ and provided with two pins $b^7$ for engagement by a detent $b^8$ carried by a door $b^9$ of the housing $c$ of the register mechanism. When the door is closed and locked, as ordinarily, accidental movement or improper manipulation of the compensating mechanism is thus prevented. In the plates $b^2$ and $b^3$ are mounted pins $b^{10}$ on each of which are mounted two differential gears $b^{11}$, $b^{12}$ connected to rotate together with a sleeve $b^{13}$. The two gears of each pair have different numbers of teeth and the corresponding gears of the several pairs have different numbers of teeth. Thus, the lower gear $b^{11}$ of each pair may have 28 teeth, while the upper gear of the same pair may have 27 teeth; the gears of the second pair may have 29 teeth and 28 teeth respectively; the gears of the third pair may have 30 teeth and 29 teeth respectively; and so on.

Mounted in a suitable bearing supported by the plate $b^1$ eccentrically with respect to the annular plates $b^2$, $b^3$ is a spindle $b^{14}$ which has secured to it a differential gear $b^{15}$ and receives above the gear $b^{15}$ a gear $b^{16}$ carried by a sleeve $b^{17}$ mounted loosely on the spindle. At its upper end the sleeve $b^{17}$ carries a driving head $b^{18}$ which, in the construction illustrated, is provided with pins $b^{19}$ adapted to engage a skew gear $b^{20}$ rotatably supported by the bottom plate $c^1$ of the housing $c$ of the register mechanism and engaging a coacting skew gear $b^{21}$ on the drive shaft $b^{22}$ of the register mechanism. The two gears $b^{15}$ and $b^{16}$ are also differential gears, the one having, it may be, 30 teeth while the other has, it may be, 31 teeth.

The teeth of the gears $b^{11}$ and $b^{12}$ of the several pairs of differential gears, mounted on the rotatable carrier, and the teeth of the gears $b^{15}$ and $b^{16}$, mounted on the eccentrically disposed spindle $b^{14}$, are cut so that any of the upper gears $b^{12}$ will run smoothly with the gear $b^{16}$ while any of the gears $b^{11}$ will run smoothly with the gear $b^{15}$. In the embodiment of the invention illustrated when the gears of the fourth pair, having respectively 31 teeth and 30 teeth, are in mesh with the gears $b^{15}$ and $b^{16}$, the spindle $b^{14}$ and the driving head $b^{18}$ turn at the same speed, the gear ratio being 1.000. If then the gear frame or carrier is turned so as to bring the gears of the third pair, having respectively 30 teeth and 29 teeth, into mesh with the gears $b^{15}$ and $b^{16}$ the gear ratio will be approximately .9989, or a difference of about one-tenth of one percent. In like manner, by shifting another pair of differential gears a different ratio can be established between the spindle and the driving head and therefore between the measuring instrumentality or meter and the register mechanism.

It will be understood that within the limits determined by the ratios of the several sets of differential gears supported by the rotatable carrier any desired ratio between the measuring instrumentality and the register mechanism can be established by opening the door $b^9$ of the register mechanism, thereby unlocking the compensating mechanism, and then rotating the carrier to bring into mesh with the gears on the spindle $b^{14}$ the proper pair of differential gears $b^{11}$, $b^{12}$, as indicated by suitable marking on the circumferential wall $b^4$ of the carrier brought into alignment with the pointer $b^{23}$.

The enclosing wall $b^4$ has formed thereon figures or characters, as shown in Figure 4, which represent the setting of the compensating mechanism, and in order that a visual indication of the setting may be had at all times from the outside a window is provided at a suitable point in the casing, as at $b^{9x}$ in the door $b^9$, through which the figures on the compensating mechanism may be read.

It will be understood that various changes in arrangement and relation of parts can be made to suit different conditions of use and that, except as pointed out in the accompanying claim, the invention is not restricted to the particular construction shown and described herein. It will also be understood that the compensating mechanism is capable of use in connection with other measuring instrumentalities and other forms of registers than those illustrated.

I claim as my invention:

A compensating mechanism comprising two gears mounted to rotate independently on a common axis, a movable gear carrier, a series of pairs of differential gears supported by said carrier, the gears of each pair being adapted to rotate together and to engage respectively the first named gears, a housing, a door for said housing, and means carried by said door and adapted when the door is closed to engage operatively the carrier to prevent movement thereof.

CHARLES S. HAZARD.